(No Model.)

A. EDWARDS.
MERCURY SEAL TRAP.

No. 339,749. Patented Apr. 13, 1886.

WITNESSES:
T. F. Holden.
G. B. Richmond

INVENTOR,
Abraham Edwards
By S. J. VanStavoren
ATTORNEY

UNITED STATES PATENT OFFICE.

ABRAHAM EDWARDS, OF NEW YORK, N. Y.

MERCURY-SEAL TRAP.

SPECIFICATION forming part of Letters Patent No. 339,749, dated April 13, 1886.

Application filed August 4, 1885. Serial No. 173,522. (No model.)

*To all whom it may concern:*

Be it known that I, ABRAHAM EDWARDS, a citizen of the United States, residing at New York, in the county of New York and State of New York, have invented certain new and useful Improvements in Mercury-Seal Traps, of which the following is a specification, reference being had therein to the accompanying drawings, wherein—

Figure 1:
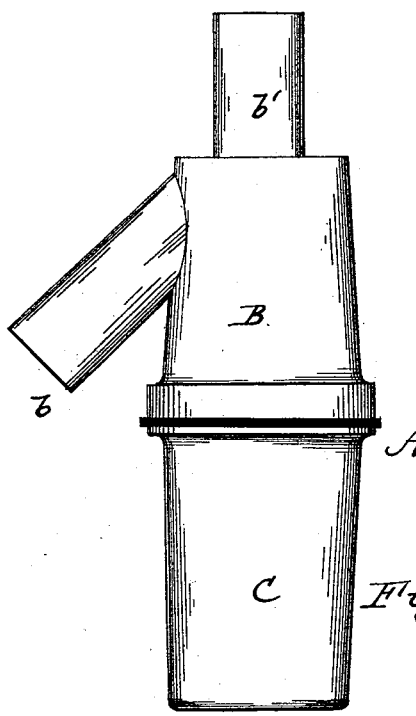
Figure 2:
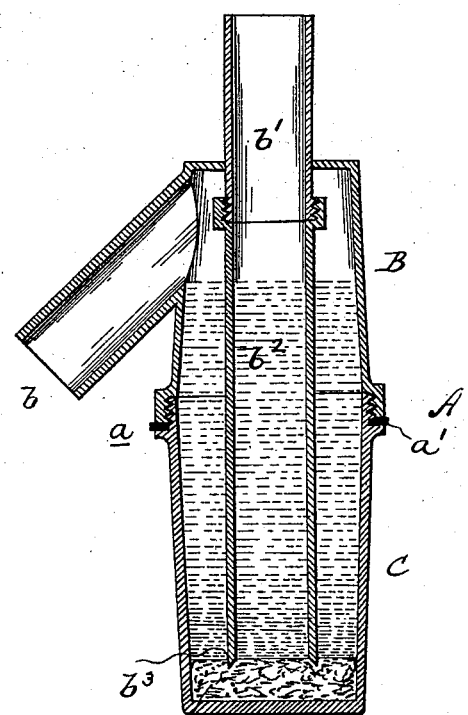
Figure 4:
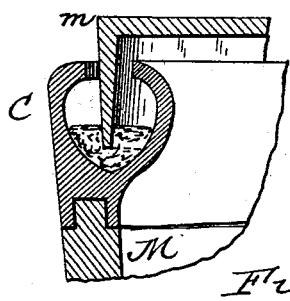
Figure 3:
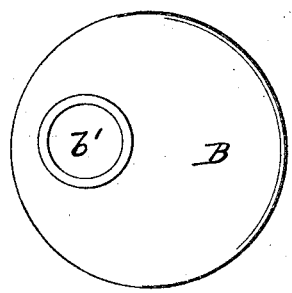

Figure 1 is an elevation, and Fig 2 a vertical transverse section, of a trap embodying my improvements. Fig. 3 is a transverse section showing induction-pipe arranged eccentrically to the body of the trap; and Fig. 4 is a section of a portion of an upper part of a water-closet bowl having a mercury-sealed cover, showing mercury-trough embodying my invention.

My invention has relation to mercury-seals for water-closets and traps in general, but more particularly to the trap shown and described in Letters Patent of the United States dated October 23, 1883, No. 287,369. In this patent it is stated that chloride of sodium is present in sewage, and that the decomposition of the chloride of sodium as it comes in contact with the mercury furnishes chloride enough to form with the mercury a minute quantity of corrosive sublimate, which serves as an additional protection, inasmuch as it gradually accumulates upon or spreads itself over the inside walls of the trap in the form of a film which destroys the development of the bacteria or the fungus growth from which emanate the disease-germs found in sewer-gas. The corrosive sublimate so formed depends for its formation upon the presence in the sewage of the chloride of sodium, and, consequently, if it is present in exceedingly minute quantities, or if not present at all the formation of the sublimate is practically either too minute to be of any benefit or is wholly wanting.

To avoid the disadvantage of limited or no formation of the sublimate in mercury-seal traps is the object of my present invention, and to accomplish this I do not depend upon the chloride of sodium in the sewage, but make such sodium or other suitable chlorine compound an essential element or a component part of the substance composing the trap-body or its mercury-containing chamber, whereby a positive supply of sodium is provided to keep up the chemical action between it and the mercury, to form at all times the requisite quantity of corrosive sublimate for destroying or retarding the fungus growth in the trap.

My invention accordingly consists of a mercury-seal trap having a body or a mercury-containing chamber made of a chemically-prepared substance, of which chloride of sodium forms an element, the material used being preferably vulcanized rubber, in which the sodium is incorporated before the rubber is vulcanized.

My invention further consists of the combination, construction, and arrangement of parts, as hereinafter described and claimed.

In the drawings, A represents the mercury-seal trap, having, preferably, a top and a bottom section, B and C, respectively screwed or otherwise secured together, as shown at $a$, with an interposed gum gasket or packing, $a'$, for making an air-tight joint. The top section, B, is preferably made of metal of any suitable kind, having a side eduction-pipe, $b$, a central induction-pipe, $b'$, into which screws a pipe, $b^2$, depending into the mercury E in the bottom of section C. The lower inner edge of pipe $b^2$ is beveled, as shown at $b^3$, to produce a sharp lower edge or end for pipe $b^2$, to afford easier displacement of the mercury by a column of water in pipes $b'$ $b^2$. The bottom section, C, is the mercury-containing chamber, and it is preferably made of vulcanized india-rubber or other material, either chemically or otherwise prepared, of which, preferably, chloride of sodium forms a component ingredient, or which is incorporated in it when prepared. If vulcanized rubber is employed, the chloride of sodium is preferably added to the rubber before being vulcanized. Any suitable proportion of the sodium may be used with the rubber. I have found that seventy parts of fine para, eight of electro-silicon, two of lamp-black, eight of zinc, ten of sulphur, and two of chloride of sodium give a trap-body suitable for my purpose; but these proportions may be varied, as desired, or according as a greater or less quantity of corrosive sublimate is required in the trap.

The chloride of sodium being present in the prepared trap-body or its mercury-containing chamber, a supply of such material is always at hand for gradual decomposition by the mercury to form corrosive sublimate as needed. As the latter is formed it gradually spreads itself in a film-like form over the inner walls of the chamber C, and also the surface of the induction-pipe, thus destroying fungus growth or disease germs entering or existing in the trap.

In using a chemically-prepared trap-body or a mercury-containing chamber, I do not limit myself to the form shown, for the reason that while I deem it a preferable form, yet other configurations of the same may with equal advantage be employed. Again, the chloride of sodium may be mixed with the other ingredients composing the trap-body or the mercury-containing chamber; or, if desired, any suitable material having the chloride of sodium or chlorine as a component ingredient may be employed as a substitute for the chloride of sodium, *per se*. Thus, for instance, Labanaque's solution may be used, it being a solution made by subjecting quicklime to the action of chlorine gas. So, too, if desired, the entire trap-body, instead merely its mercury-containing chamber, may be made of a chemically-prepared substance, as above described.

In Figs. 1 and 2 of the drawings I have shown the induction-pipe of the trap arranged concentric with the body of the latter; but an eccentric or other suitable arrangement of said parts may be made, if desired, as indicated in Fig. 3. In applying my invention to any form of water-closets having mercury seals, especially those having a sealed lid, which is moved out of the way by the raising of the seat-lid, a type of which is shown in Letters Patent granted to myself on the 31st of May, 1881, the trough or other receptacle may be made of vulcanized rubber or other material having chloride of sodium as an ingredient, as above described. A part of such trough or receptacle is illustrated at C, Fig. 4. This trough or receptacle is connected to bowl M in any suitable manner, and *m* shows part of the lid dipping into the mercury in trough C.

What I claim is—

1. A mercury-seal trap having a body or its mercury-containing chamber made of a prepared mixture or compound containing chlorine, as and for the purpose set forth.

2. A mercury-seal trap having a body or chamber made of vulcanized rubber and a mixture of chloride of sodium, as and for the purpose set forth.

3. A mercury-containing chamber or reservoir for traps, water-closets, and like fixtures, composed of a compound mixed with chloride of sodium, substantially as described.

In testimony whereof I affix my signature in presence of two witnesses.

ABRAHAM EDWARDS.

Witnesses:
 S. J. VAN STAVOREN,
 CHAS. F. VAN HORN.